Oct. 16, 1923.
W. F. HARRINGTON
1,470,976
CHANGE SPEED GEARING FOR AUTOMOBILES
Filed June 9, 1919
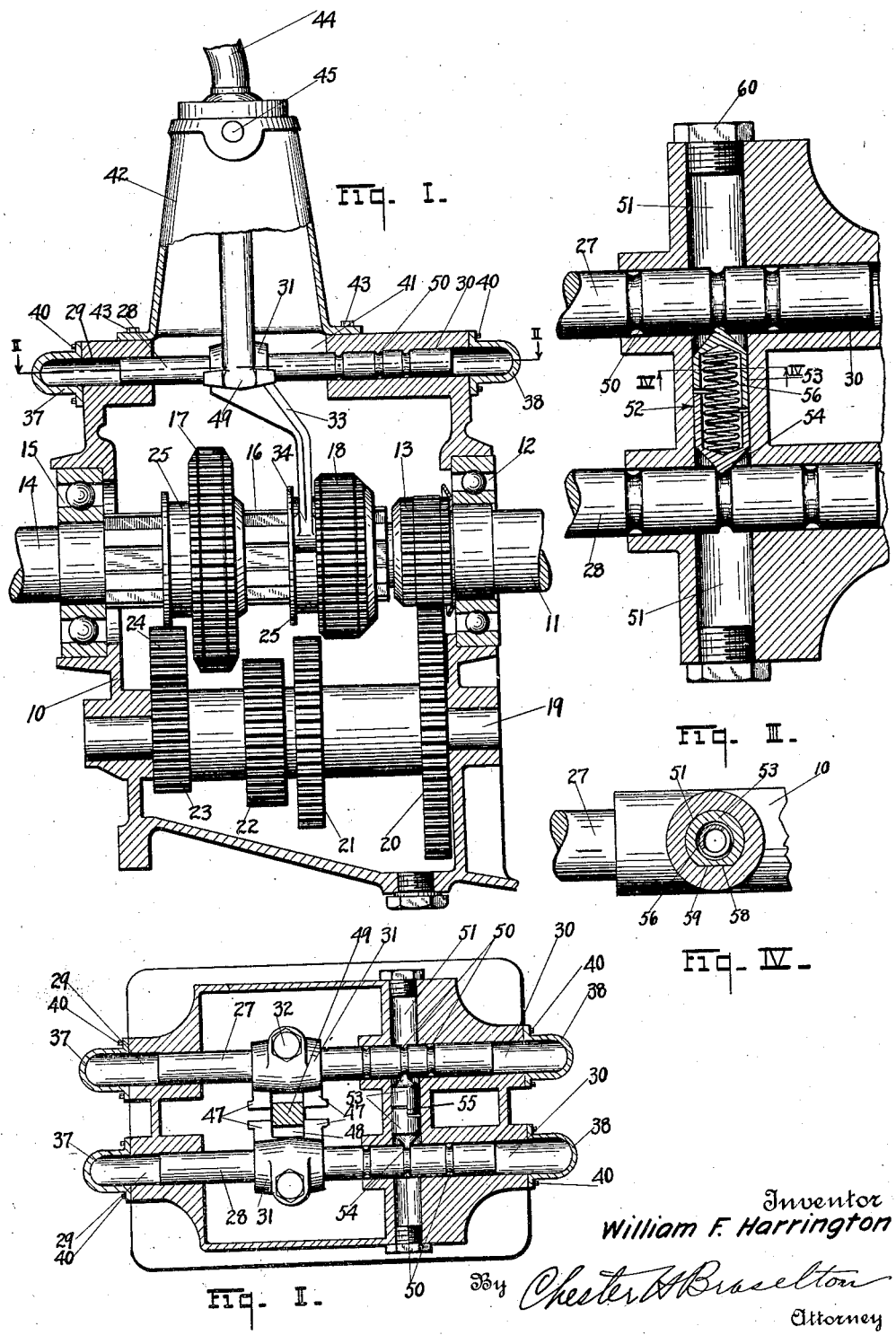
Inventor
William F. Harrington
By Chester H. Braselton
Attorney Patented Oct. 16, 1923.

1,470,976

UNITED STATES PATENT OFFICE.

WILLIAM F. HARRINGTON, OF TOLEDO, OHIO, ASSIGNOR TO THE WILLYS-OVERLAND COMPANY, OF TOLEDO, OHIO, A CORPORATION OF OHIO.

CHANGE-SPEED GEARING FOR AUTOMOBILES.

Application filed June 9, 1919. Serial No. 302,755.

*To all whom it may concern:*

Be it known that I, WILLIAM F. HARRINGTON, a subject to the King of Great Britain, residing at Toledo, county of Lucas, State of Ohio, have invented certain new and useful Improvements in Change-Speed Gearing for Automobiles, of which I declare the following to be a full, clear, and exact description.

This invention relates to change speed gearing for automobiles, and more especially to mechanism adapted to control the movement of the movable gears in such a manner as to prevent injury thereto when changing to different speeds.

One object of the invention is to provide a mechanism of this character for controlling the operation of the movable gears to prevent the engagement of more than one of these gears with one of the gears on the counter-shaft at any time.

A further object of this invention is to provide a mechanism of the character described for positively retaining one of the movable gears in neutral position at all times.

Another object of the invention is to provide mechanism of the character described, which is of simple construction and efficient in operation.

Further objects of this invention relate to economies of manufacture and details of construction as will hereinafter appear from the detailed description to follow.

The objects of the invention are accomplished in one instance by the devices and means described in the following specification, but it is evident that the same may be varied widely without departing from the scope of the invention, as pointed out in the appended claims.

A structure constituting one embodiment of the invention, which may be the preferred, is illustrated in the accompanying drawing forming a part hereof, in which:

Figure I is a vertical-longitudinal section through the transmission casing of an automobile, showing the relative position of the operating mechanism with respect to the transmission shaft.

Figure II is a horizontal-sectional view, taken along the line II—II of Figure I, showing the relative position of the operating mechanism for controlling the movement of the movable gears.

Figure III is an enlarged-sectional view showing details of the mechanism, and illustrating its manner of operation.

Figure IV is a vertical-sectional view, taken along the line IV—IV of Figure III, and illustrating features of the detent mechanism.

Similar reference characters refer to corresponding parts throughout the several views, and the sectional views are taken looking in the direction of the small arrows at the ends of the section lines.

Referring to the drawings, 10 indicates a transmission casing of the conventional type having a driving element or power shaft 11 extending within the casing, and rotatably mounted in a bearing 12, positioned in one end thereof. The driving element or power shaft is adapted to be operatively connected with an engine (not shown), and carries a driving pinion 13 firmly secured thereto within the casing. A drive shaft 14 is rotatably mounted in an anti-friction bearing 15 carried by the casing, and is so positioned as to be in axial alignment with the power shaft 11. The end of the drive shaft 14 which extends within the transmission casing is provided with a plurality of splines 16 so arranged as to permit movement of the movable gears 17 and 18 carried by the drive shaft in a direction longitudinally of the shaft, and at the same time prevent rotation of these gears with respect to the shaft. A counter-shaft 19 is also mounted in suitable bearings carried by the casing, and is positioned substantially parallel with the longitudinal axis of the drive shaft 14. A plurality of gears 20, 21, 22 and 23 are firmly secured to the counter-shaft and rotate therewith. The gear 20 is continually in mesh with and constantly driven by the pinion 13 secured to the end of the power shaft. The gears 21, 22 and 23 are thus constantly rotated from the driving pinion 13. A gear 24 is carried by a fixed shaft (not shown) and is constantly in mesh with and continually rotated by the gear 23 carried by the counter-shaft.

The movable gears 17 and 18 are each provided with a shifting collar 25 for engagement by shifting arms whereby the said gears may be moved in a direction longitudinally of the drive shaft. The pinion 13 is adapted to be constantly rotated by the movement of the power shaft 11, thus communicating rotative movement of the gear 20, and the counter-shaft 19 together with the gears 21, 22 and 23 carried by the counter-shaft, and the gear 24 which is constantly in mesh with the gear 23. The gears 17 and 18 are shown in Figure I as occupying their neutral positions, in which they are out of mesh with the gears carried by the counter-shaft, and so positioned that the power shaft rotates freely without communicating rotative movement to the drive shaft. When the movable gear 18 is moved forwardly into close engagement with the pinion 13, clutch mechanism (not shown) is provided for securing driving engagement between the adjacent faces of the gear 18 and pinion 13, whereby the drive shaft is directly operated from the power shaft. If, however, the movable gear 18 is moved rearwardly a sufficient distance, it will be placed in mesh with the gear 21 carried by the counter-shaft, whereby rotative movement may be imparted to the drive shaft from the power shaft through the counter-shaft 19, and in the same direction as by engagement of the gear 18 with the driving pinion 13 but at a lower speed. If the movable gear 17 is moved in a forwardly direction, it is adapted to be placed in mesh with the gear 22 carried by the counter-shaft, thus rotative movement is imparted to the drive shaft through the counter-shaft, in the same direction as the rotative movement imparted to the shaft by means of the gear 18, but at a lower rate of speed as will be evident upon comparing the relative sizes of the gears 17 and 22. If, however, the movable gear 17 is moved in the opposite direction, towards the rear, it will be placed in mesh with the gear 24, whereby rotative movement will be imparted to the drive shaft in a direction opposite to that in which it would be rotated under the several conditions previously described.

The mechanism previously described comprises the conventional form of transmission mechanism commonly used in automobiles, so arranged as to enable the drive shaft to be rotated at varying degrees of speed, and also making it possible to reverse the direction of rotation of the drive shaft when desired. It is obvious that serious difficulties would be encountered if through accident or otherwise the movable gears 17 and 18 should both be placed in mesh at the same time with one of their meshing gears. It is highly desirable, therefore, to provide mechanisms which will positively retain one of these gears in neutral position whenever the other gear is moved from its neutral position, and only permit movement of the first gear after the second gear has been returned to neutral position. In order to best provide mechanism for properly controlling the movement of the movable gears 17 and 18, a pair of longitudinally slidable rods 27 and 28 are slidably mounted in oppositely positioned registering bearings 29 and 30 formed in the upper part of the gear casing. The longitudinally slidable rods are so positioned as to extend substantially parallel with each other at all times.

Each of these rods has firmly secured thereto a split collar 31 the parts of which are firmly clamped to each of the rods by means of a bolt 32, each of said collars 31 being provided with a downwardly extending arm 33 having forked ends 34 adapted to partially embrace one of the shifting collars 25 in such a manner as to control the movement of one of the movable gears. The split collars 31 together with the downwardly extending arms 33 and forks 34, are of similar construction and are so arranged that they each control one of the gears 17 and 18. Caps 37 and 38 are adapted to be firmly secured to the ends of the transmission casing by means of bolts or like fastening means 40 for the purpose of properly inclosing the bearings 29 and 30 to prevent foreign matter from becoming lodged therein. An opening 41 is formed in the upper portion of the transmission casing for the purpose of permitting free movement of the collars 31 and their associated parts in a direction longitudinally of the casing.

A supplemental casing 42 is provided, which may be secured to the upper surface of the transmission casing by means of bolts or similar fastening means 43, and which serves to cover the opening 41 formed in the upper portion of the transmission casing and provide as a support for the control lever 44. The control lever 44 is pivotally mounted at 45 in the supplemental housing in such a manner that the control lever pivots freely on the point 45. The split collars 31 are oppositely positioned upon the rods 27 and 28, each of said collars being provided with a pair of inwardly extending ears 47, so positioned as to provide oppositely extending registering slots 48. The control lever 44 is provided with a squared portion 49 at its lower end, which is adapted to be positioned within the space formed by the oppositely extending slots 48 in such a manner as to control the movement of the longitudinally slidable rods 27 and 28 by exerting pressure against the ears 47. The control member 44 is mounted in such a manner that the lower end thereof is capable of moving in a direction longitudinally of the casing, and is also capable of a slight movement in a transverse direction within the slots 48.

Each of the longitudinally movable rods is provided with a plurality of depressions or grooves 50 formed near one end thereof, and spaced from each other longitudinally of the rods for a purpose which will now be described. In the present instance the grooves or depressions formed in each rod are three in number. A transversely extending opening 51 is formed within the top portion of the casing, in the same horizontal plane with the bearings 30 provided for the ends of the longitudinal slidable rods, and communicating with the bearings 30. A detent mechanism 52 is adapted to be positioned within the transverse passage 51 between the longitudinally slidable rods 27 and 28. The detent mechanism comprises a pair of similar hollow cylindrical members 53, each of which is provided with a tapered end portion 54 which is adapted to be positioned within one of the grooves or depressions formed in the longitudinally slidable rods. These sections 53 are provided with angular mating facing 55 so formed as to prevent rotation of the sections with respect to each other within the passage 51, and a coiled compression spring 56 is adapted to be positioned within the hollow interior of the sections and bear against the opposite ends thereof in such a manner as to urge the ends 54 into close engagement with the grooves or depressions formed in the slidable rods. The three grooves or depressions formed in the slidable rods correspond to the three positions of the movable gears 17 and 18, one of which is controlled by each of the slidable rods. The intermediate grooves or depressions formed in each of the slidable rods are so positioned as to be in registry with the tapered end 54 of the detent mechanism when the gear controlled by that rod is in its neutral position. The two outer grooves or depressions 50 formed in each of these rods are so positioned as to be in registry with the tapered end 54 of the detent mechanism when the gear controlled by that rod is in each of its opposite positions of engagement respectively.

The depth of these depressions formed in the rods is such that when the parts are in the position shown in Figures II and III, the intermediate grooves which are shown in registry with the opposing ends of the detent mechanism permit the sections 53 to be slightly displaced outwardly with respect to each other, so that when force is applied to one of the longitudinally movable rods to move the same in a longitudinal direction the sections of the detent mechanism can be forced together a sufficient distance to permit one of the rods to be displaced until the end of the detent mechanism co-operating therewith engages with one of the exterior grooves or depressions. While in this position of the parts the second rod is held against movement until the first named rod is released to its original position. The parts of the detent mechanism are so formed that the sections can not be forced together to permit both rods being moved at the same time. Consequently, it is impossible to move that rod and the gear controlled thereby from their neutral position until the first rod is returned to its neutral position, so that the opposite end of the detent mechanism will come into engagement with the middle groove, and therefore permit the second rod to be moved.

The passage 51 formed in the upper portion of the transmission casing is not perfectly circular in outline, but is provided with a flattened or angular interior surface 58, which is adapted to co-operate with a flattened or angular portion 59 on the outer surface of the detent sections, as shown in Figure IV, whereby the detent sections are prevented from rotating within the passage 51 and thus prevents the tapered end portions 54 of the detents 53 from getting out of alignment with the grooves 50. The opposite ends of the passage 51 are closed by means of screw caps 60 which are threaded within the outer ends of this passage, thus completely excluding dust or other foreign matter therefrom.

In the operation of the mechanism above described, the power shaft is driven from the engine (not shown) in the usual manner, whereby rotation is imparted to the pinion carried by the power shaft and to the counter-shaft, together with the several gears carried thereby. The drive shaft which is mounted in axial alignment with the power shaft carries the movable gears 17 and 18 thereon, in such a manner as to render them capable of movement in a direction axially of the drive shaft, and in opposite directions from their neutral position. The movable gears 17 and 18 are shown in Figure I as occupying their neutral positions intermediate of the points where they are each adapted to be positioned when imparting rotative movement to the drive shaft. The movement of the longitudinal movable gears is controlled by the forked arms 34 rigidly secured to the corresponding longitudinally slidable rods 27 and 28, which rods as shown in Figure II, are in their neutral position when so placed that the pointed ends of the detent mechanism are adapted to engage with the intermediate groove or slot formed in each rod.

The slidable rods are adapted to be selectively actuated by the control lever 44, by reason of pressure exerted by the lower squared portion 49 thereof against the ears 47 extending inwardly from the split collars 31. By reason of the slight movement in a direction transverse of the transmission gearing which the lower end 49 of the control lever is capable, the lower end of the control lever 49 can be pushed in either direction transversely of the transmission casing from its position as shown in Figure II, so as to be in contact with the ears 47 carried by one only of the collars 31. Either one of the slidable rods may thus be moved in longitudinal direction by means of the control lever, and when returned to its original position so that the oppositely extending slots 48 are in registry with each other, the control lever may be shifted transversely and from that position the opposite sliding rod may be moved in a longitudinal direction. As the longitudinally slidable rods are moved axially in their bearings, the corresponding forked arms 34 are similarly displaced in a longitudinal direction within the transmission casing, thus communicating movement to the movable gears 17 and 18. Since in the neutral position of the slidable rods the oppositely extending tapered ends of the detent sections engage with the intermediate slots or grooves formed in each of the sliding rods, these grooves being of sufficient depth to permit sufficient movement of the detent sections relative to each other upon force being exerted upon one of the slidable rods for the purpose of displacing the same axially with respect to the other so that either one of the slidable rods may be moved a sufficient distance in either direction to permit the detent mechanism to engage with one of the end grooves or recesses formed in that rod. When either of the slidable rods is thus moved, the corresponding sliding gear controlled thereby will be similarly moved, and when the slidable rod is displaced a sufficient distance so that the detent mechanism engages with one of the end grooves or slots, the corresponding sliding gear will have been moved a sufficient distance to properly mesh with one of its cooperating gears for the purpose of communicating movement to the drive shaft from the power shaft. When, however, one of the slidable rods has been moved from its neutral position in either direction, the fact that the grooves are of only sufficient depth so that as the pointed end of one of the detent sections passes out of the groove the detent sections are positioned so near together that the pointed end of the other detent section can not be released from the middle groove until the first rod is returned to its neutral position, so that the control lever is in position to actuate the second rod. This is true even when the first rod is displaced a sufficient distance so that the corresponding detent sections engage with one of the outer grooves or slots carried by the rod, since the control lever is not then in position to actuate the second rod. Thus each slidable rod is locked in its neutral position during any movement of the other slidable rod from its neutral position, which locking mechanism is releasable to permit movement of the first named rod only upon the return of the second slidable rod to its neutral position. It will be observed, that this mechanism positively prevents the accidental movement of one of the gears from its neutral position at any time when the other gear is moved from its neutral position.

While I have shown and described in considerable detail a specific embodiment of my invention, it is to be understood that this showing and description is illustrative only, and for the purpose of rendering my invention more clear, and that I do not regard the invention as limited to the details of construction illustrated or described, nor any of them, except in so far as I have included such limitation within the terms of the following claims, in which it is my intention to claim all novelty inherent in my invention broadly as well as specifically.

Having thus described my invention, what I claim as new and desire to secure by Letters Patent is:

1. In a change speed gearing, the combination of a plurality of driving gears, a driven shaft, a plurality of gears on said driven shaft, means to selectively engage each of the gears carried by the driven shaft with one or more of the driving gears, and detents for preventing movement of either of the gears on the driven shaft from its neutral position except when the other gear mounted on the driven shaft is in its neutral position, a guide for said detents, said detents comprising mating sections provided with offset portions to increase the bearing surface with said guide and prevent binding of said sections.

2. In a change speed gearing, a plurality of shifter arms, a longitudinal slidable rod to which each shifter arm is secured, means for selectively moving the slidable rods, and a detent for locking each slidable rod in its neutral position during the movement of the other rod from its neutral position, said detent comprising spaced apart sections provided with overlapping co-operating extensions, each section having a flattened portion to prevent a section from rotating the co-operating sections when the detent is operated.

3. In a change speed gearing, a pair of longitudinally slidable rods, a shifter arm secured to each rod, means for selectively moving the slidable rods, and a spring pressed detent for locking each slidable rod in its neutral position during the movement of the other rod from its neutral position, the said detent comprising spaced apart sections provided with co-operating overlapping projections.

4. In a change speed gearing, a pair of longitudinally slidable rods, provided with depressions formed therein, a shifter arm carried by each rod, means for selectively moving the slidable rods, and a detent adapted to engage certain of the depressions formed in the rods to prevent displacement of both rods from their neutral positions at the same time, the said detent being provided with a flattened portion to prevent rotation of the detent.

5. In a change speed gearing, a pair of longitudinally slidable rods, a shifter arm carried by each rod, means for selectively moving the slidable rods, spring pressed means comprising mating sections for locking each slidable rod in its neutral position during the movement of the other rod from its neutral position, the mating sections being provided with a flat portion and a passage through which the detent slides, said passage being provided with a flat portion, the flat portions co-operating to prevent rotation of the detent.

6. In a change speed gearing, a pair of longitudinally slidable rods, a shifter arm carried by each rod, means for selectively moving the slidable rods, spring pressed means comprising mating sections for locking each slidable rod in its neutral position during the movement of the other rod from its neutral position releasable to permit movement of the first rod upon the return of the second rod to its neutral position, and means to prevent rotation of the mating sections.

7. In a change speed gearing, a pair of longitudinally slidable rods provided with depressions of different depths formed therein, a shifter arm carried by each rod, means for selectively moving the slidable rods, and a detent comprising mating sections adapted to engage certain of the depressions formed in the rods to prevent displacement of both rods from their neutral position at the same time, the said mating sections being provided with oppositely extending projections slidable upon each other.

8. In a change speed gearing, a pair of longitudinally slidable rods provided with depressions formed therein, a shifter arm carried by each rod, means for selectively moving the slidable rods, and a detent adapted to engage certain of the depressions formed in the rods to prevent displacement of both rods from their neutral positions at the same time, said detent comprising mating sections capable of longitudinal movement with respect to each other, the said mating sections being provided with overlapping semi-cylindrical portions slidable upon each other.

9. In a change speed gearing, a pair of longitudinally slidable rods provided with depressions formed therein, a shifter arm carried by each rod, means for selectively moving the slidable rods, and a detent adapted to engage certain of the depressions formed in the rods to prevent displacement of both rods from their neutral positions at the same time, said detent comprising mating sections capable of longitudinal movement with respect to each other, and means for preventing rotation of the detent sections about their longitudinal axes.

10. In a change speed gearing, a pair of longitudinally slidable rods provided with depressions formed therein, a shifter arm carried by each rod, means for selectively moving the slidable rods, and a detent comprising mating sections capable of longitudinal movement with respect to each other, means tending to separate said mating sections, a guide for said detent, and means to prevent rotative movement of said mating sections in said guide.

In testimony whereof, I affix my signature.

WILLIAM F. HARRINGTON.